M. KELLOW.
WATER DRIVEN TURBINE.
APPLICATION FILED JULY 11, 1914.

1,210,326.

Patented Dec. 26, 1916.
2 SHEETS—SHEET 2.

Witnesses:
E. Blunden.
E. J. Kimmins.

Inventor

UNITED STATES PATENT OFFICE.

MOSES KELLOW, OF PENRHYNDENDRAETH, WALES.

WATER-DRIVEN TURBINE.

1,210,326.    Specification of Letters Patent.    Patented Dec. 26, 1916.

Application filed July 11, 1914. Serial No. 850,454.

*To all whom it may concern:*

Be it known that I, MOSES KELLOW, a subject of the King of Great Britain and Ireland, residing at Penrhyndendraeth, in the county of Merioneth, Wales, have invented new and useful Improvements in and in Connection with Water-Driven Turbines, of which the following is a specification.

This invention relates to improvements in and in connection with water-driven turbines to increase the efficiency thereof, while at the same time effecting a considerable reduction in the dimensions thereof in a radial sense.

Figure 1:
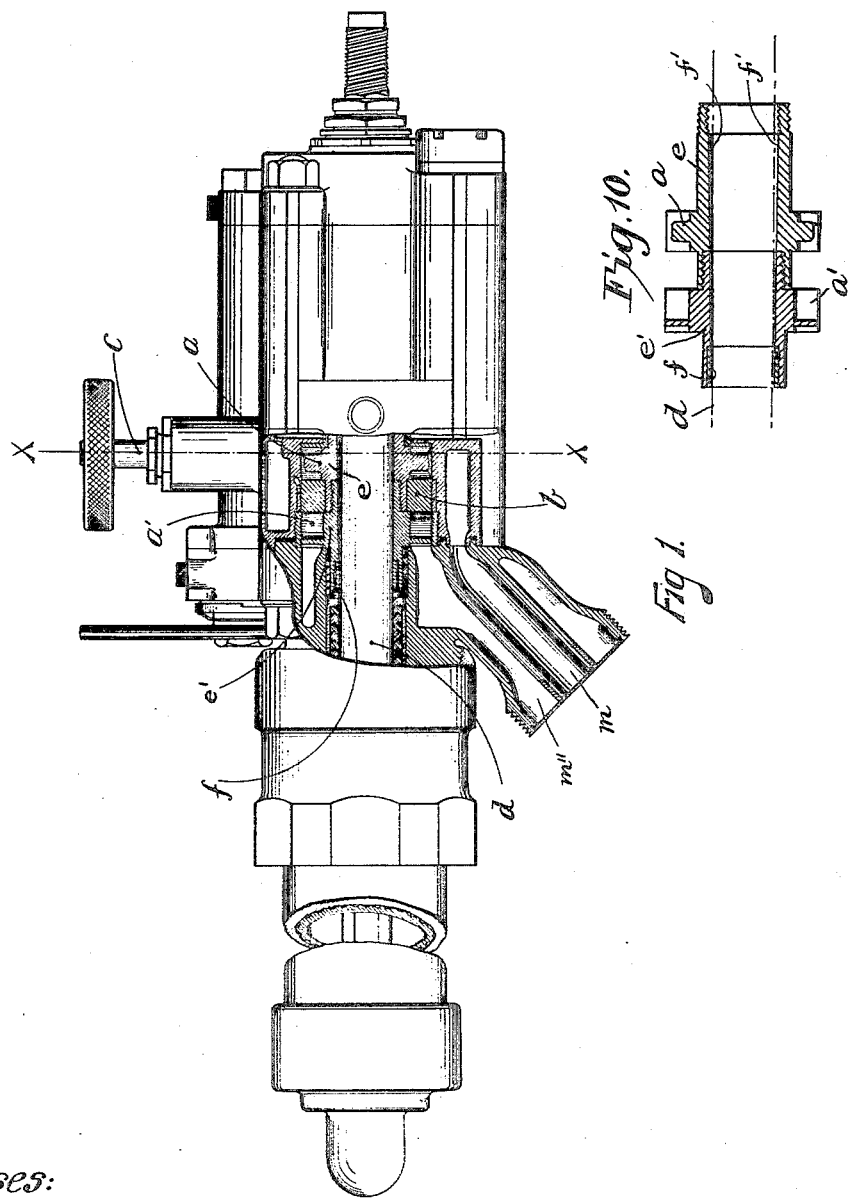
Figure 2:
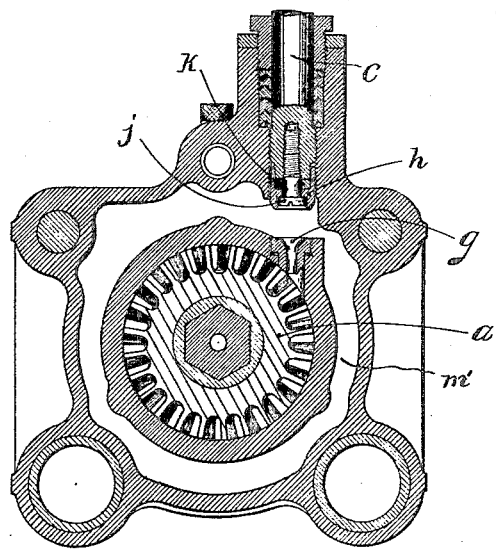
Figure 3:
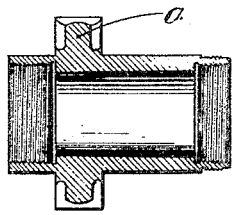
Figure 5:
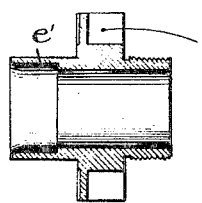
Figure 4:
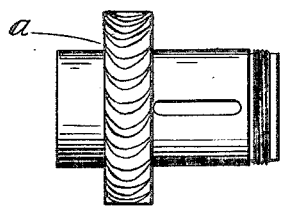
Figure 6:
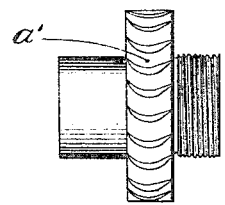
Figure 7:
Figure 8:
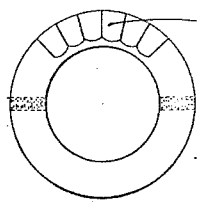
Figure 9:

In the accompanying drawings, Figure 1 is a general view illustrating, partly in side elevation and partly in longitudinal section, the application of a turbine constructed according to my improved method to, by way of example, a rock-drill of the type described in the specifications to Letters Patent of the United States granted to me and bearing date the 26th May, 1908, No. 888,506, and the 9th June, 1908, No. 890,065. Fig. 2 is a transverse section taken on the line $x$—$x$ in Fig. 1, while Figs. 3 and 4 are detail views respectively in longitudinal section and plan illustrating the first-stage turbine wheel hereinafter referred to. Figs. 5 and 6 are corresponding views illustrating the second-stage turbine wheel, while Figs. 7, 8 and 9 are respectively a vertical section, side elevation and plan illustrating the reversing vanes hereinafter referred to, as also the body in which they are formed. Fig. 10 illustrates, on an enlarged scale, certain details including the sleeves and the taper, hereinafter referred to.

According to my present invention, the turbine is of the two-stage or compound type comprising in the present example two turbine wheels including the two sleeves $e, e'$ having blades $a, a'$ thereon. These sleeves are threaded together and form a bore through which runs a shaft $d$, which shaft $d$ forms a casing for a rock-drill. Between the vanes $a$ and $a'$, is arranged a stationary guide-vane ring $b$, the blades of which are arranged to receive the propelling fluid from vane $a$ and, by reversing its direction of flow, cause it to impinge on vane $a'$ in the same direction as on vane $a$, thus giving a cumulative effect to the action of the fluid on the vanes $a$ and $a'$. Under such conditions, the diameter of the turbine may be reduced by one half, and, in the case of a rock-drill, the radial dimensions of the drill as a whole may be very considerably reduced with the effect of enabling it to drill a hole correspondingly closer to the sides of a heading than hitherto; while, at the same time, rendering the drill lighter and more portable. A further advantage is that the skin-friction, which is an important consideration when working with high-pressure turbines, is greatly reduced. According to my present construction, the immersed rotating surfaces are but small, and, the peripheral speeds being reduced by one half, the loss due to skin-friction per unit of area is only about one-fourth that entailed by the use of a single-stage turbine. The area of the immersed surfaces and the skin-friction per unit of area having both been considerably reduced, a large total reduction in the skin-friction is secured, and the devices employed in my prior construction to reduce skin-friction are rendered unnecessary.

The water is admitted through inlet pipe $m$ to chamber $m'$, and thence through valve seat $g$ to the first-stage wheel $a$, which valve seat is adapted to be covered by valve $h$. The water is thus introduced to the blade of the wheel in a direction substantially tangent to its periphery and transverse to the axis of the wheel, and not, as is usual in axial-flow turbines, at the sides thereof. The water flows out through pipe $m''$. The water is thus more efficiently directed against the vanes, and higher efficiency results.

The shaft to be driven, which in the present illustration is the drill-rod casing $d$, passes through the turbine-shaft $e$ and the frictional surfaces of the casing and of the turbine which are in contact are of considerable length and circumferential area. With relative speeds of rotation of between 5,000 and 6,000 r. p. m., the fluid friction of the lubricant becomes a consideration of some importance. With a view to the partial elimination thereof, I arrange a loose sleeve $f$ in the enlarged portion $e''$ of the bore of sleeve $e'$ of the second-stage vane $a'$, shown in Fig. 5, between said sleeve $e'$ and the shaft $d$. The sleeve $f$ is dragged around at a speed intermediate the speeds of shaft $d$ and sleeve $e'$, and thus the relative speed between either shaft $d$ and sleeve $f$, or between sleeves $e'$ and $f$, are much less than between sleeve $e'$ and shaft $d$, if sleeve $f$ was not used. By this means the total friction is greatly reduced, fluid friction varying, approximately, as the square of the velocities of the surfaces in contact. By increasing the number of the surfaces which are capable of movement, the velocities are reduced in proportion, and the total frictional loss varies as the sum of the squares. The bore of sleeves $e$, $e'$ is formed with a slight taper $f'$, with the effect that, when it is rotated at a high speed, a thin film of oil will travel along the inside surface of the shaft, from one bearing to the other, without coming into contact with the drill-rod casing $d$, thus tending to reduce the fluid friction of the lubricant in the parts of the bore where the sleeves $e$, $e'$ and the shaft $d$ do not contact.

The spindle $c$ of the screw-down valve, whereby the supply of water to the turbine is controlled, terminates, as shown in Fig. 2, at its lower extremity in a metal cap $h$, which is held to the spindle by means of a screw $j$ and serves as the head of the valve, and, between the said cap $h$ and the extremity of the spindle $c$, is arranged a packing ring $k$, whereof the yielding character enables the cap $h$ to adjust itself correctly on the seating $g$ and so prevent any leaking.

I claim:—

1. A compound water-driven turbine constructed substantially as herein described, same comprising a first-stage turbine wheel having blades adapted for a tangential application of the water-jet, a second-stage turbine wheel adjacent the first-stage wheel, a nozzle adapted to apply water to the periphery of the first-stage turbine wheel, and reversing vanes arranged between the latter and the second-stage turbine wheel.

2. A compound axial-flow water-driven turbine comprising a runner having peripheral blades to which the water jet is applied tangentially, and means for so applying the jet, substantially as described.

3. In a water-driven turbine, a driven shaft, sleeves arranged around said shaft, a plurality of impeller vanes mounted on said sleeves, the bore of said sleeves being formed with a slight taper from end to end with respect to said shaft.

4. In a water-driven turbine, a driven shaft, sleeves arranged around said shaft, a plurality of impeller vanes mounted on said sleeves, a portion of the bore of one of said sleeves being enlarged, and a loose sleeve arranged in said enlarged portion of the bore between said sleeve and said shaft.

5. In a multi-stage axial-flow water-driven turbine, a plurality of wheels carrying blades constituting the various stages of the turbine, said blades adapted for axial flow of the driving fluid, reversing vanes arranged between each stage, each of said vanes adapted to introduce the driving fluid to the next set of blades in the direction of the axis of the wheel, and means for introducing the driving fluid to the first stage blades in a direction tangential to and in the plane of the first stage wheel.

M. KELLOW.

Witnesses:
  O. J. WORTH,
  H. D. JAMESON.